(12) United States Patent
Keskikangas et al.

(10) Patent No.: US 12,401,769 B2
(45) Date of Patent: Aug. 26, 2025

(54) CAMERA INFORMATION HANDOVER

(71) Applicant: Axis AB, Lund (SE)

(72) Inventors: Axel Keskikangas, Lund (SE); Song Yuan, Lund (SE); Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/464,313

(22) Filed: Sep. 11, 2023

(65) Prior Publication Data

US 2024/0114115 A1 Apr. 4, 2024

(30) Foreign Application Priority Data

Oct. 3, 2022 (EP) ..................................... 22199361

(51) Int. Cl.
*H04N 7/18* (2006.01)
*H04N 23/66* (2023.01)
*H04N 23/81* (2023.01)
*H04N 23/88* (2023.01)

(52) U.S. Cl.
CPC ............. *H04N 7/188* (2013.01); *H04N 23/66* (2023.01); *H04N 23/81* (2023.01); *H04N 23/88* (2023.01)

(58) Field of Classification Search
CPC ........ H04N 7/188; H04N 23/66; H04N 23/81; H04N 23/88; H04N 23/617; H04N 23/60; H04N 23/62; H04N 23/631; H04N 23/73; H04N 7/181; G08B 13/19636; G08B 13/19645; G08B 13/19669; G08B 13/19695; G08B 13/19608; G06T 5/00; G06T 5/20; G06T 7/194; G06T 7/292; G06T 2207/10044

See application file for complete search history.

(56) References Cited

U.S. PATENT DOCUMENTS

| | | | |
|---|---|---|---|
| 9,082,278 B2 | 7/2015 | Park | |
| 9,092,877 B2* | 7/2015 | Guan | ...................... G06T 7/248 |
| 11,076,099 B1* | 7/2021 | Xu | ........................... H04N 23/61 |
| 2010/0231738 A1* | 9/2010 | Border | ................... H04N 9/8205 |
| | | | 348/222.1 |

(Continued)

FOREIGN PATENT DOCUMENTS

| | | |
|---|---|---|
| AU | 2020202221 A1 | 10/2020 |
| CN | 101572804 B | 11/2009 |

(Continued)

*Primary Examiner* — Michael Lee
(74) *Attorney, Agent, or Firm* — Volpe Koenig

(57) ABSTRACT

A system and method trigger a second camera in a camera system to perform an action prior to an object appearing in the field of view of the second camera. The camera system includes the second camera for which a location and a field of view is known, and at least a first device for which a location is known. The method comprises receiving, in the second camera, information indicating that the object is approaching the field of view of the second camera. The received information indicates a location and a direction of movement of the object, and, in response to the received information, triggers the second camera to action prior to the object appearing in the field of view of the second camera by: generating an intra frame or initiating an intra refresh procedure, adjusting one or more image processing parameters, or adjusting an exposure time.

17 Claims, 2 Drawing Sheets

200

S210 — A second camera receiving information indicating that an object is approaching the field of view of the second camera, the received information being based on information form a first device indicating location and direction of movement of the object S220 — In response to the received information, trigger the second camera to perform one of the following actions prior to the object appears in the field of view of the second camera:

a) generate an intra frame or initiate an intra refresh procedure
b) adjust one or more image processing parameters, and
c) adjust an exposure time

(56) References Cited

U.S. PATENT DOCUMENTS

| | | |
|---|---|---|
| 2014/0051921 A1 | 2/2014 | Miller et al. |
| 2015/0207971 A1 | 7/2015 | Enomoto et al. |
| 2015/0220789 A1* | 8/2015 | Wood .................. G06T 7/246 |
| | | 382/103 |
| 2017/0091563 A1 | 3/2017 | Chen et al. |
| 2017/0270375 A1* | 9/2017 | Grauer ................ G06V 10/60 |
| 2018/0308243 A1 | 10/2018 | Justice |
| 2019/0043207 A1 | 2/2019 | Carranza et al. |
| 2019/0261491 A1 | 8/2019 | Abalos et al. |
| 2021/0168379 A1* | 6/2021 | Fan ..................... H04N 19/61 |
| 2022/0309977 A1* | 9/2022 | Lu ........................ G09G 3/20 |
| 2023/0147070 A1* | 5/2023 | Driscoll ................ G01S 7/03 |
| | | 342/175 |

FOREIGN PATENT DOCUMENTS

| | | |
|---|---|---|
| KR | 20220009617 A | 1/2022 |
| WO | 2016/105093 A1 | 6/2016 |
| WO | 2022/141418 A1 | 7/2022 |

\* cited by examiner

CAMERA INFORMATION HANDOVER

TECHNICAL FIELD

The present invention relates to preparing a camera before an object appears in the field of view of the camera, and specifically to triggering actions in a camera before an object appears in the field of view of the camera.

BACKGROUND

In camera systems including one or more cameras it may be useful to predict when something of interest, such as an object, is likely to appear in the field of view of a camera. For example, in surveillance systems at some premises, the opening of a door into a room may indicate that a person may appear in the field of view of a camera of the surveillance system if the camera covers a portion of the room. In such cases it is known to start recording of a video from the camera when it is detected that the door is opened. Furthermore, in some prior art camera systems comprising more than one camera, information regarding tracked objects is handed over between cameras. However, there is still a need for improvements in preparing a camera of a cameras system before an object appears in the field of view of the camera.

SUMMARY OF THE INVENTION

An object of the present invention is to facilitate enhancements preparing a camera of a cameras system before an object appears in the field of view of the camera.

According to a first aspect, a method for triggering a second camera to perform one or more actions prior to an object appearing in the field of view of the second camera is provided. The second camera is arranged in a camera system including the second camera and at least a first device. A location and a field of view is known for the second camera and a location is known for the first device. The method comprises receiving, in the second camera, information indicating that the object is approaching the field of view of the second camera, wherein the received information is based on information from the first device indicating a location and a direction of movement of the object, and in response to the received information, triggering the second camera to perform one or more of the following actions prior to the object appearing in the field of view of the second camera: a) generating an intra frame or initiating an intra refresh procedure, b) adjusting one or more image processing parameters, and c) adjusting an exposure time.

By 'infra refresh procedure' is meant a procedure where each image frame of a set of image frames is divided into a plurality of subareas and where one or more subareas of the plurality of subareas are intra encoded in a first image frame, different one or more subareas of the set of subareas are intra encoded in a second image frame, and so forth until all subareas of the plurality of subareas have been intra encoded over the set of image frames.

By 'image processing parameters' are meant parameters for processing of an image frame once it has been captured in the camera. Such processing includes but is not limited to color balancing, white balancing, low light noise filtering, temporal noise filtering, and background segmentation.

By 'exposure time' is meant the time which a sensor is exposed when capturing an image frame in the camera. This time may be controlled by a mechanical shutter which mechanically covers the sensor and is removed during a time corresponding to the exposure time or it may be controlled by an electronic shutter which emulates a mechanical shutter by only using data read out from the sensor during a time corresponding to the exposure time. The exposure time is typically the same for all areas in an image frame. However, one image frame may be created by combination of a set of image frames each having a separate exposure time. For such images different subareas may include data from different of the set of image frames and may hence be said to have different exposure times.

By 'prior to the object appearing in the field of view of the second camera' is meant before any part or portion of the object appears in the field of view of the second camera.

Since the location of the first device and the location and field of view of the second camera are known, information can be received in the second camera indicating that the object is approaching the field of view of the second camera based on information from the first device indicating a location and a direction of movement of the object. By using the received information to trigger the second camera to perform one or more of three actions prior to the object appearing in the field of view of the second camera, an enhancement of adaptation to the change of the scene when the object enters the field of view of the second camera is enabled.

By triggering generation of an intra frame (I-frame) before the object appears in the field of view of the second camera, the increased number of bits of the !-frame in relation to a P- or B-frame is induced before the object appears in the field of view of the second camera. This will result in an I-frame with fewer number of bits than if the I-frame were to be encoded when the object appears in the field of view of the second camera. Furthermore, when the object appears in the field of view of the second camera, this will increase the need for generating I-blocks which will typically increase the number of bits of the encoded image frame in which they included. Similarly, movement of the object will also generally increase the number of bits of an image frame as encoded. Hence, the increased number of bits of image frames due to generation of an I-frame and due to the object appearing in the field of view of the second camera and also due to the movement of the object can be spread out over more than one image frame, thus reducing the maximum size of image frames.

By triggering adjustment of image processing parameters and/or of exposure time before the object appears in the field of view, adjustment of the image processing parameters and/or the exposure prior to the object appearing in the field of view of the second camera is enabled. For example, adjustment in relation to the fact that the object is moving is enabled. Furthermore, adjustment to optimize processing is enabled, e.g. by adjusting contrast, noise level, color rendering, resolution, etc.

The received information may further indicate a time when the object is estimated to appear in the field of view of the second camera. By knowing a time when the object is estimated to appear in the field of view of the second camera, a better timing of the performing of one of the three actions prior to the object appearing in the field of view of the second camera can be achieved in relation to if triggering of one of the action were carried out as a result of the object being detected after appearing in the field of view of the second camera.

The received information may further indicate a subarea of the field of view of the second camera in which the object is expected to first appear. By knowing a subarea, the one or more actions may be performed in relation to the subarea.

Generating an intra frame or initiating an intra refresh procedure may then comprise first intra refresh of subareas of image frames of the second camera that do not correspond to the subarea of the field of view of the second camera in which the object is estimated to first appear and then intra refresh of a subarea of image frames of the second camera that corresponds to the subarea of the field of view of the second camera in which the object is estimated to first appear. The intra refresh of subareas of image frames of the second camera that do not correspond to the subarea of the field of view of the second camera in which the object is estimated to first appear is started at a time such that it can be finished before the object is estimated to first appear in the field of view of the second camera. The intra refresh of the subarea of image frames of the second camera that corresponds to the subarea of the field of view of the second camera in which the object is estimated to first appear is then performed starting, and optionally also ending, just before the time when the object appears in that subarea, at the time when the object appears in that subarea, or short thereafter. If it started and ended just before the time when the object appears in that subarea, the encoding of that subarea once the object appears will typically require encoding of I-blocks in at least portions of that subarea.

By triggering intra refresh, i.e. intra encoding, of subareas of image frames of the second camera that do not correspond to the subarea of the field of view of the second camera in which the object is estimated to first appear before the object appears the field of view of the second camera, the increased number of bits due to the intra refresh in relation to a regular P- or B-frame is induced before the object appears in the field of view of the second camera. This will result in a frame with fewer number of bits than if a complete I-frame were to be encoded when the object appears in the field of view of the second camera. Furthermore, when the object appears in the field of view of the second camera, this will increase the need for generating I-blocks which will typically increase the number of bits of the encoded image frame in which they included. Similarly, movement of the object will also generally increase the number of bits of an image frame as encoded. Hence, the increased number of bits of image frames due to generation of !-blocks and due to the object appearing in the field of view of the second camera and also due to the movement of the object can be spread out over more than one image frame, thus reducing the maximum size of image frames. Additionally, since the subarea corresponding to the subarea of the field of view of the second camera in which the object will appear first will have to be updated with I-blocks when the object appears, the intra refresh, i.e. intra encoding, of that subarea can be postponed until after the object has appeared. In this way the size of the image frame where the other subareas are intra-encoded can be reduced in relation to a complete I-frame.

Additionally, or alternatively, adjusting one or more image processing parameters, and/or adjusting an exposure time may be performed locally in a subarea of image frames of the second camera that corresponds to the subarea of the field of view of the second camera in which the object is estimated to first appear. By adjusting the one or more image processing and/or adjusting the exposure time locally in the subarea of the image frame, enhancement of the image in the subarea is enabled in relation to the object. For example, the one or more image processing parameters, and/or the exposure in the subarea can be adjusted in relation to the fact that the object is moving, or in relation to metadata received regarding size, color, object type etc.

Additionally, or alternatively, adjusting one or more image processing parameters may comprise reducing low light noise filtering in a subarea of image frames of the second camera that corresponds to the subarea of the field of view of the second camera in which the object is estimated to first appear. By reducing low light noise filtering in the subarea, the risk that the object is not visible in the subarea if the subarea is noisy due to low light can be reduced.

Additionally, or alternatively, adjusting an exposure time may comprise setting a shorter exposure time in a subarea of image frames of the second camera that corresponds to the subarea of the field of view of the second camera in which the object is estimated to first appear than in subareas of image frames of the second camera that do not correspond to the subarea of the field of view of the second camera in which the object is estimated to first appear.

Adjusting one or more image processing parameters may comprise one or more of setting the one or more image processing parameters to respective middle values as starting values for parameter optimization, and reducing a threshold for background segmentation. By setting the one or more image processing parameters to respective middle values, faster optimization of the values of the image processing parameters is enabled. By reducing a threshold for what is classified as foreground in a background segmentation before the object appears in the field of view of the second camera, enables faster detection of the object as a foreground object. Both reducing the threshold and performing a background merge before the object appears in the field of view of the second camera will increase the possibility that the object is classified as foreground and hence is not missed in relation to detection or masking.

The received information may further indicate a velocity of the object. Adjusting an exposure time may then be based on the velocity of the object such that the higher the velocity, the shorter the exposure time. Additionally, or alternatively, adjusting one or more image processing parameters may comprise setting a temporal noise filter level based on the velocity of the object such that the higher the velocity, the higher the temporal noise filter level.

The second camera may further be triggered to perform two or more of the actions.

The received information may further indicate a class of the object.

The first device may be one of, but not limited to, a first camera, a radar, a lidar, a thermal camera, and a sonar sensor.

If the first device is a first camera, the received information may further comprise color balance correction or white balance correction of the first camera. Adjusting one or more image processing parameters then comprises setting color balance correction or white balance correction according to the received information.

According to a second aspect, a non-transitory computer-readable storage medium is provided having stored thereon instructions for implementing the method according to the first aspect, when executed in a device having at least a receiver, a processor, and an encoder.

According to a third aspect, a camera configured to perform one or more actions prior to an object appearing in the field of view of the camera is provided. The camera comprises a receiver configured to, when the camera is arranged in a camera system including the camera and at least another device and a location and a field of view is known for the camera and a location is known for said another device, receive information indicating that the object is approaching the field of view of the camera, wherein the received information is based on information from another device indicating a location and a direction of movement of the object. The camera further comprises an encoder, and circuitry configured to execute a triggering function configured to, in response to the received information, trigger the camera to perform one or more of the following actions prior to the object appearing in the field of view of the second camera: a) generating an intra frame or initiating an intra refresh procedure, b) adjusting one or more image processing parameters, and c) adjusting an exposure time.

The above-mentioned optional additional features of the method according to the first aspect, when applicable, apply to the camera according to the third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

The present invention will now be described hereinafter with reference to the accompanying drawings, in which currently preferred embodiments of the invention are illustrated. This invention may, however, be embodied in many different forms and should not be construed as limited to the embodiments set forth herein.

Figure 1:
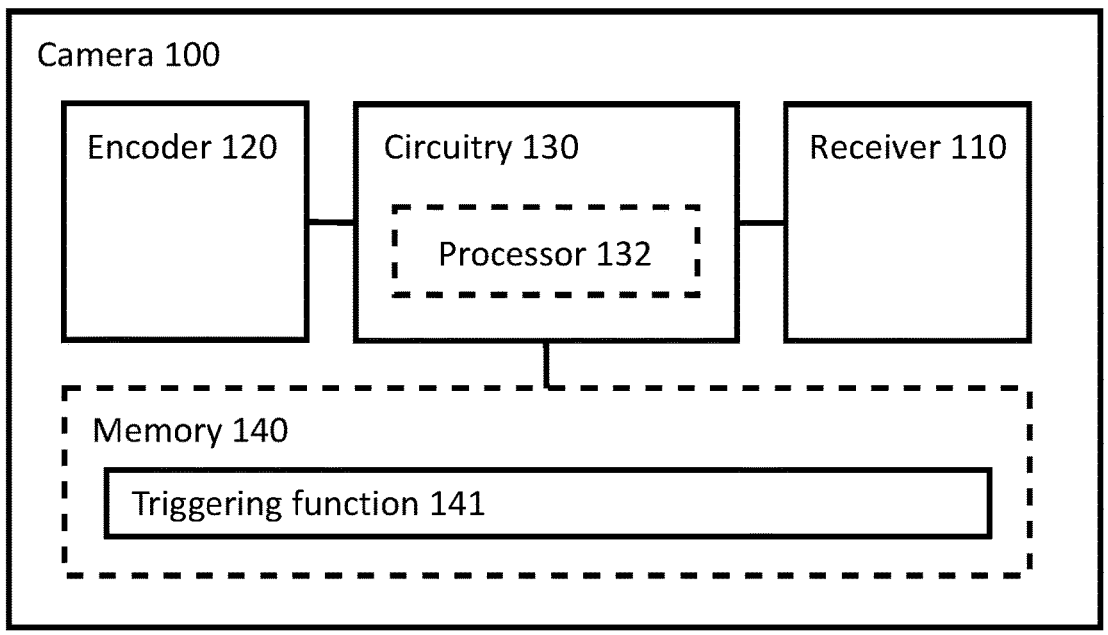
FIG. 1 shows a schematic diagram in relation to embodiments of a camera configured to perform one or more actions prior to an object appearing in the field of view of the camera.

FIG. 1 shows a schematic block diagram of embodiments of a camera 100 (second camera in the following) configured to perform one or more actions prior to an object appearing in the field of view of the camera. The second camera 100 may be any type of camera, such as a security camera or surveillance camera, which may be arranged in a camera system including the second camera 100 and at least another device, wherein a location and a field of view is known for the second camera 100 and a location is known for said another device. Said another device may for example be another camera. The second camera 100 captures a sequence of image frames, e.g. in the form of a video, wherein each image frame depicts a scene defined by the field of view of the second camera 100.

The second camera 100 comprises a receiver 110, an encoder 120, and circuitry 130. The camera will typically also comprise an image sensor (not shown) and image processor (not shown).

The receiver 110 is configured to, when the second camera 100 is arranged in a camera system including the second camera 100 and at least another device and a location and a field of view is known for the second camera 100 and a location is known for said another device, receive information indicating that the object is approaching the field of view of the second camera 100. The received information is based on information from said another device indicating a location and a direction of movement of the object.

The encoder 120 is configured to encode image data captured by an image sensor of the second camera 100 into a video stream. Sometimes the video stream output by the encoder 120 is referred to as an encoded video stream. Typically, the video encoder 120 is configured to encode some of the image frames of the video stream as intra frames and some of the image frames of the video stream as inter frames. An intra frame is an encoded video frame that does not require information from other video frames to be decoded. Hence, an intra frame is encoded based on information from the image frame of video data it is set to correspond to. Typically, similarities within the image frame are used to encode the image frame into an intra frame. In video encoding an intra frame is often referred to as an I-frame. The image frames of the video stream in between two intra frames are encoded as inter frames. An inter frame is encoded based on information from at least one other image frame to be encoded than the image frame of video data the inter frame is set to correspond to. Inter frames typically comprise less data than intra frames. In video encoding an inter frame is often referred to as a P-frame or a B-frame. P-frames refer to previous frames for data reference. Hence, the content of previous frames must be known in order to decode a P-frame. B-frames may refer to both previous and forward frames for data reference. Hence, the content of both the previous and forward frames must be known in order to decode a B-frame.

The circuitry 130 is configured to carry out functions of the second camera 100. The circuitry 130 may include a processor 132, such as a central processing unit (CPU), microcontroller, or microprocessor. The processor 132 is configured to execute program code. The program code may for example be configured to carry out the functions of the second camera 100.

The second camera 100 may further comprise a memory 140. The memory 140 may be one or more of a buffer, a flash memory, a hard drive, a removable media, a volatile memory, a non-volatile memory, a random access memory (RAM), or another suitable device. In a typical arrangement, the memory 140 may include a non-volatile memory for long term data storage and a volatile memory that functions as system memory for the circuitry 130. The memory 140 may exchange data with the circuitry 130 over a data bus. Accompanying control lines and an address bus between the memory 140 and the circuitry 130 also may be present.

The functions of the second camera 100 may be embodied in the form of executable logic routines (e.g., lines of code, software programs, etc.) that are stored on a non-transitory computer readable medium (e.g., the memory 140) of the second camera 100 and are executed by the circuitry 130 (e.g., using the processor 132). Furthermore, the functions of the second camera 100 may be a stand-alone software application or form a part of a software application that carries out additional tasks related to the second camera 100. The described functions may be considered a method that a processing unit, e.g., the processor 132 of the circuitry 130, is configured to carry out. Also, while the described functions may be implemented in software, such functionality may as well be carried out via dedicated hardware or firmware, or some combination of hardware, firmware and/or software.

The circuitry 130 of the second camera 100 is configured to execute a triggering function 141. The triggering function 141 is configured to, in response to the received information in the receiver 110 indicating that the object is approaching the field of view of the second camera 100, trigger the second camera 100 to perform one or more of the following actions prior to the object appearing in the field of view of the second camera 100 a) generating an intra frame or initiating an intra refresh procedure, b) adjusting one or more image processing parameters, and c) adjusting an exposure time.

The second camera 100 is configured to be arranged in a camera system including the second camera 100 and at least a first device. Specifically, the camera system including the second camera 100 and the first device should be arranged and configured such that the location of the first device and the location and field of view of the second camera 100 are known, and such that information indicating a location and a direction of movement of the object can be provided from the first device. Information indicating that the object is approaching the field of view of the second camera 100 to be received in the second camera 100 may then either be prepared in a centralized solution using a central server or in a distributed solution using the first device and second camera 100. In the centralized solution, only the central server needs to know the location of the first device and the location and field of view of the second camera 100. After receiving information from the first device indicating location and direction of movement of the object, the central server may then prepare the information indicating that the object is approaching the field of view of the second camera 100 and provide this information to the second camera 100. In the distributed solution, the first device may send the information indicating location and direction of movement of the object directly to the second camera 100 and the second camera 100 may then, being aware of its own location and field of view, determine whether the object is approaching the field of view of the second camera 100, and when it is, trigger one or more of the three actions. In the latter case, the information indicating that the object is approaching the field of view of the second camera 100 would be the information indicating a location and a direction of movement of the object received from the first device.

In addition to indicating that the object is approaching the field of view of the second camera 100, the received information may further indicate a time when the object is estimated to appear in the field of view of the second camera 100 and/or a velocity of the object. By knowing a time when the object is estimated to appear in the field of view of the second camera 100, a better timing of the performing of one of the three actions prior to the object appearing in the field of view of the second camera 100 can be achieved. The first device may calculate the time when the object is estimated to appear in the field of view of the second camera 100 based on the velocity of the object and the location and field of view of the second camera.

Furthermore, the field of view of the second camera 100 may be logically divided into a set of subareas, wherein each subarea corresponds to a respective subarea of each image frame of the second camera 100. The received information in the second camera may then further indicate the subarea of the field of view of the second camera 100 in which the object is expected to first appear. By knowing a subarea, the one or more actions may be performed in relation to the subarea.

To determine the location and direction of movement of an object would typically require the first device to provide at least 2-dimensional representations over time. Hence, the first device may be one of, but not limited to, a first camera, a radar, a lidar, a thermal camera, and a sonar sensor. In such scenarios, in a centralized solution, the first device may determine a relative location and relative direction of movement in relation to its location and field of view by detection of the object over a sequence of image frames. The centralized server could then, knowing the absolute or relative location and field of view of both the first device and the second camera 100, determine whether the object is approaching the field of view of the second camera 100, and when it is, provide such information to the second camera 100. In a distributed solution, the knowledge of the location and field of view of the first device and second device in relation to a common coordinate system may be located in the respective devices. In alternative, the each device may have the relative location of the other device. The location and direction of movement of the object may then be determined in the first device by detection of the object over a sequence of image frames and information indicating the location and direction of movement of the object may be provided to the second camera 100. The second camera 100 may then, being aware of its own location and field of view, determine whether the object is approaching the field of view of the second camera 100, and when it is, trigger one or more of the three actions. In the latter case, the information indicating that the object is approaching the field of view of the second camera 100 would be the information indicating a location and a direction of movement of the object received from the first device. From the detections of the object over a sequence of image frames of the first device, an estimated velocity of the person (object) and/or an estimated time when the person (object) will enter the field of view of the second camera 100 can be determined. Furthermore, from the location and direction of movement, the subarea of the field of view of the second camera 100 in which the object will appear can be determined.

In some scenarios, the first device may include one or more sensors indicating only that an object has passed a specific point or line. For example, if the first device includes a sensor that can sense that a person has passed through a door, or passed a line, which leads into a corridor or other confined space, where the second camera 100 has a location and field of view at the other end of the corridor or other confined space, information from the first device that a person has passed the door or the line will then constitute information that the person (object) is approaching the field of view of the second camera 100 based on the knowledge of the location of the first device and the location and field of view of the second camera 100. If the first device includes one or more further sensors at known locations along the corridor or other confined space, an estimated velocity of the person (object) and/or a better estimation of the time when the person (object) will enter the field of view of the second camera 100 can be determined. In such scenarios, the field of view of the second camera 100 can be divided into subareas where one subarea is closest to the one or more sensors of the first device. In such a case, the subarea of the field of view of the second camera 100 in which the object will appear can be determined as the subarea closes to the one or more sensors of the first device.

Generally, it is not essential how the location of the first device and the location and field of view of the second device is determined as long as it is determined and then known either centrally or distributed such that the second camera 100 can receive information indicating that the object is approaching its field of view, wherein the information is based on information from the first device indicating the location and direction of movement of the object. For example, the location of the first device and the location and field of view of the second device may be determined at set up of the camera system, e.g. using gps positioning and/or location of mounting based on a map. In alternative the location of the first device and the location and field of view of the second device may be determined using a self-learning system which receives information of detection and movement of objects in the first device and the second camera and over time determines the location of the first device and the location and field of view of the second device and/or whether or not an object having a particular location and direction of movement according to the first device is approaching the field of view of the second camera 100.

One of the actions that may be triggered in response to the received information is generation of an intra frame or initiation of an intra refresh procedure. When the received information indicates that the object is approaching the field of view of the second camera 100, generation of an I-frame is triggered before the object appears in the field of view of the second camera 100. After such an I-frame has been generated, the quality of the background is enhanced which means that, when the object appears in the field of view of the second camera 100, there will be less need for I-blocks in relation to areas including only the background and not the object. An advantage of generating the I-frame before the object enters the field of view of the second camera 100 is that such an I-frame will typically be larger in number of bits in relation to a P-frame or B-frame. When the object then appears in the field of view of the second camera 100, there will be a need for generating I-blocks in relation to the object. Such I-blocks will increase the number of bits of the encoded image frame. Similarly, the movement of the object will also generally increase the number of bits of each encoded frame during the movement of the object in the field of view. Hence, by triggering the generation of an I-frame to update the background occur before the object appears in the field of view of the second camera 100, the increased number of bits due to this will be in different encoded frames than encoded frames including increased number of bits due to generation of I-blocks when the object appears and due to the movement of the object.

If the received information indicates the time when the object is estimated to appear in the field of view of the second camera 100, the generation of the I-frame or the intra refresh can be timed in relation to that time, namely before the object is estimated to appear in the field of view of the second camera 100, preferably just before.

If the received information further indicates the subarea of the field of view of the second camera 100 in which the object is expected to first appear, generation of !-blocks can be adapted by means of an intra refresh procedure adapted to this.

Figure 3:
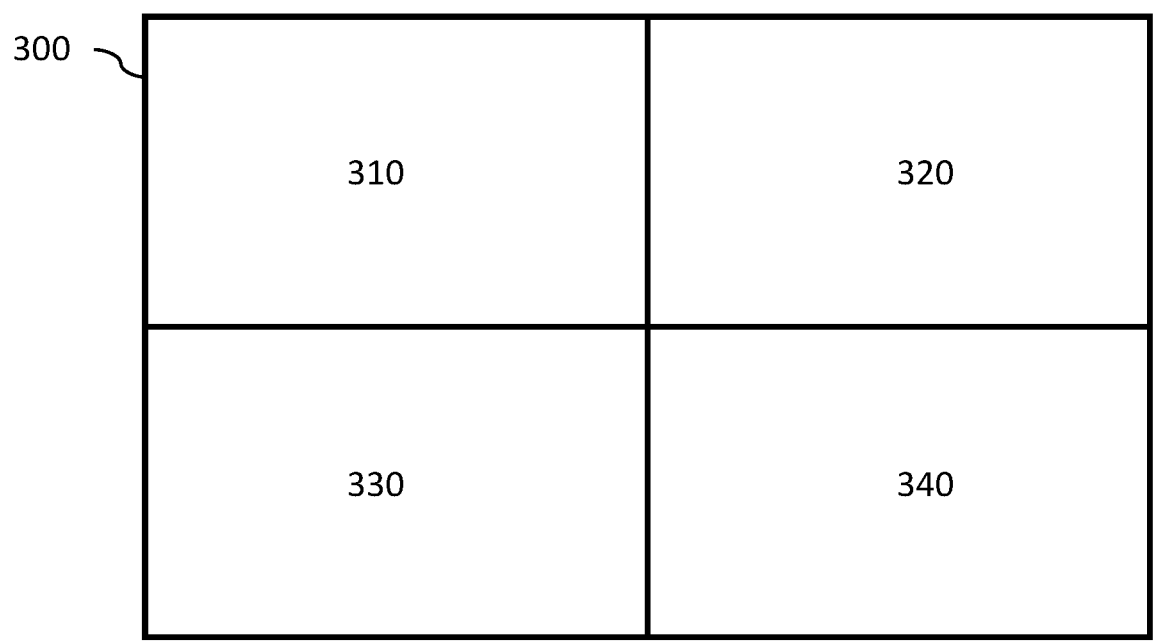
FIG. 3 shows an example of division of an image frame into subareas.

Generally, an intra refresh procedure is a procedure where each image frame of a set of image frames is divided into a plurality of subareas and where one or more subareas of the plurality of subareas are intra encoded in a first image frame, different one or more subareas of the set of subareas are intra encoded in a second image frame, and so forth until all subareas of the plurality of subareas have been intra encoded over the set of image frames. Each subarea of the image frames corresponds to a respective one of subareas of the field of view of the second camera 100. As an example, a division of an image frame 300 into four subareas 310, 320, 330, 340 is shown in FIG. 3, wherein a first subarea 310 is an upper left portion, a second subarea 320 is an upper right portion, a third subarea 330 is a lower left portion, and a fourth subarea 340 is a lower right portion of the image frame 300. Other divisions are of course possible, such as a division into more subareas and other patterns, such as horizontal or vertical stripes or other.

Generating an intra frame or initiating an intra refresh procedure may then comprise first intra refresh, i.e. intra encoding, of subareas of image frames of the second camera 100 that do not correspond to the subarea of the field of view of the second camera 100 in which the object is estimated to first appear. This may be performed by intra encoding all subareas other than the subarea corresponding to the subarea of the field of view of the second camera 100 in which the object is expected to first appear in one image frame. In alternative this may be spread out over a number of image frames, e.g. such that each subarea of the subareas other than the subarea corresponding to the subarea of the field of view of the second camera 100 is intra encoded in a separate image frame all appearing before the object is expected to enter the field of view of the second camera 100. When the object has appeared in the field of view of the second camera 100, intra encoding is performed for the subarea of the image frame of the second camera 100 that corresponds to the subarea of the field of view of the second camera 100 in which the object is estimated to first appear. In relation to FIG. 3, if the object is expected to appear first in subarea 310, intra encoding is performed first for subareas 320, 330, 340 before the object appears in the image frame 300 and then, upon or subsequent to the object appearing in the image frame 300, intra encoding is performed for subarea 310. The intra encoding for the subareas 320, 330, 340 may occur in a single image frame or in separate image frames. In an alternative embodiment, the intra encoding of the subareas 320, 330, 340 is performed in a single or separate image frames is initiated at a time such that it is completed at a time such that the intra encoding of the subarea 310 can be performed before the object is estimated to appear in the subarea 310. Once the object appears in the subarea 310, at least a subset of blocks of the subarea 310 are encoded into I-blocks.

By triggering intra refresh in subareas of image frames of the second camera 100 that do not correspond to the subarea of the field of view of the second camera 100 in which the object is estimated to first appear before the object appears the field of view of the second camera 100, it is ensured that the background is up to date, and the quality of the background is enhanced in the subareas in which the object will not appear first. In this way, when the object appears in the field of view of the second camera 100, there will be less need for I-blocks in subareas of the field of view in which the object will not appear first. When the object appears in the field of view of the second camera 100, intra refresh is triggered in the subarea of the image frame of the second camera 100 in which the object appears. This will typically increase the number of bits of the encoded image frame. Similarly, movement of the object in relation to an image frame will also generally increase the number of bits of that image frame as encoded. Hence, the increased number of bits required due to intra refresh of the subareas other than the subarea in which the object will appear will be in different encoded image frames than the encoded image frame including an increased number of bits due intra refresh of the subarea corresponding to the subarea in which the object first appears and the encoded image frames including an increased number of bits due to movement of the object. Furthermore, since the subarea of an image frame will have to be updated with I-blocks when the object appears in the corresponding subarea of the field of view, the intra refresh of that subarea can be postponed until after the object has appeared. In some embodiments however, the intra refresh of that subarea is completed before the object appears, preferably as close as possible before the object appears.

If the received information further indicates the time when the object is estimated to appear in the field of view of the second camera 100, the intra encoding of the subareas can be timed in relation to that time, e.g. such that the subarea of an image frame corresponding to the subarea in which the object appears is intra encoded when, or as soon as possible after, the object appears in the field of view of the second camera 100. As indicated hereinabove, by an object appearing is meant that any portion of the object appears in the field of view of the second camera 100.

Another of the actions that may be triggered is adjusting one or more image processing parameters. Herein, image processing parameters are parameters for processing of an image frame once it has been captured in the camera. Examples of such processing are color balancing, white balancing, low light noise filtering, temporal noise filtering, and background segmentation.

If the received information also indicates a time when the object is estimated to appear in the field of view of the second camera 100, a better timing of the triggering of adjusting the one or more image processing parameters.

For example, receiving the information indicating that the object is approaching the field of view of the second camera 100, may trigger adjustment of the one or more image processing parameters to respective middle values as starting values for parameter optimization. By setting the one or more image processing parameters to respective middle values, faster optimization of the values of the image processing parameters is enabled. Such optimization will typically be required as the image frames will be changed when the object appears in the field of view of the second camera 100. Furthermore, the choice of middle values is advantageous since the optimization is typically done iteratively using stepwise change of the parameter values to identify new local max/min values. In addition, the stride length of the iterative search during optimization may be extended (i.e. changed to be longer) since when the object appears in the field of view of the second camera 100, the image frames will change and new optimal values may differ considerable from the previous values.

One processing parameter that could be adapted is a threshold for what is classified as foreground in a background segmentation. When information indicating that the object is approaching the field of view of the second camera 100 is received, this may trigger a reduction of the threshold for what is classified as foreground in a background segmentation before the object appears in the field of view of the second camera 100. Such reduction of the threshold for what is classified as foreground in a background segmentation will enable faster detection of the object as a foreground object.

As another example, a background merge can be triggered when information indicating that the object is approaching the field of view of the second camera 100 is received. In a background merge, the division between background and foreground is removed. Identification of which portions of the image frames belong to the foreground and which portions belong to the background is then performed again when the object appears in the field of view of the second camera 100.

If the received information indicates a subarea of the field of view of the second camera 100 in which the object is expected to first appear, adjusting one or more image processing parameters may be performed locally in a subarea of image frames of the second camera 100 that corresponds to the subarea of the field of view of the second camera 100 in which the object is estimated to first appear. By adjusting the one or more image processing in the subarea of the image frame, enhancement of the image in the subarea is enabled in relation to the object. For example, the one or more image processing parameters can be adjusted in relation to the fact that the object is moving.

As another example, receipt of information indicating that the object is approaching the field of view of the second camera 100 may trigger reduction of low light noise filtering. By reducing low light noise filtering, the risk can be reduced that the object is not visible in image frames if the image frames are noisy due to low light. If the received information further indicates which subarea of the field of view the object is expected to appear first, the low light noise filtering may be reduced in the subarea of image frames of the second camera 100 that corresponds to the subarea of the field of view of the second camera 100 in which the object is estimated to appear first. By reducing low light noise filtering in the subarea, the risk can be reduced that the object is not visible in the subarea if the subarea is noisy due to low light.

If the received information indicates a velocity of the object, adjusting one or more image processing parameters may comprise setting a temporal noise filter level based on the velocity of the object. For example, the temporal noise filter level may be set such that the higher the velocity, the higher the temporal noise filter level.

If the first device is a first camera, the received information may further comprise color balance correction or white balance correction of the first camera. Adjusting one or more image processing parameters may then comprise setting color balance correction or white balance correction in the second camera 100 according to the color balance correction or the white balance correction of the first camera.

The final of the actions that may be triggered is adjusting an exposure time. Herein, exposure time is the time which a sensor is exposed when capturing an image frame in the camera. This time may be controlled by a mechanical shutter which mechanically covers the sensor and is removed during a time corresponding to the exposure time or it may be controlled by an electronic shutter which emulates a mechanical shutter by only using data read out from the sensor during a time corresponding to the exposure time. The exposure time is typically the same for all areas in an image frame. However, one image frame may be created by combination of a set of image frames, e.g. three image frames, each having a separate exposure time. For such images different subareas may include image data from different of the set of image frames and may hence be said to have different exposure times. For example, low light areas of the image frame may include image data from an image frame captured with a longer exposure time and highlight areas of the image frame may include image data from an image frame captured with shorter exposure time.

By triggering adjustment of exposure time before the object appears in the field of view of the second camera 100, adjustment the exposure to the object appearing in the field of view of the second camera 100 is enabled. For example, adjustment in relation to the fact that the object is moving is enabled.

If the received information indicates a subarea of the field of view of the second camera 100 in which the object is expected to first appear. By knowing a time when the object is estimated to appear in the field of view of the second camera 100, a better timing of the adjusting the exposure time can be achieved.

For example, adjusting an exposure time may be performed locally in a subarea of image frames of the second camera 100 that corresponds to the subarea of the field of view of the second camera 100 in which the object is estimated to first appear. By adjusting the one or more image processing and/or adjusting the exposure time locally in the subarea of the image frame, enhancement of the image in the subarea is enabled in relation to the object. For example, the one or more image processing parameters, and/or the exposure in the subarea can be adjusted in relation to the fact that the object is moving.

As another example, adjusting an exposure time may comprise setting a shorter exposure time in a subarea of image frames of the second camera 100 that corresponds to the subarea of the field of view of the second camera 100 in which the object is estimated to first appear than in subareas of image frames of the second camera 100 that do not correspond to the subarea of the field of view of the second camera 100 in which the object is estimated to first appear. This will avoid or at least reduce issues with motion blur already in the first image frame of the second camera when the object appears.

If the received information also indicates a time when the object is estimated to appear in the field of view of the second camera 100, a better timing of the triggering of the adjustment of exposure time.

If the received information indicates a velocity of the object, the exposure time may be based on the velocity of the object such that the higher the velocity, the shorter the exposure time. This will avoid or at least reduce issues with motion blur already in the first image frame of the second camera when the object appears.

Figure 2:
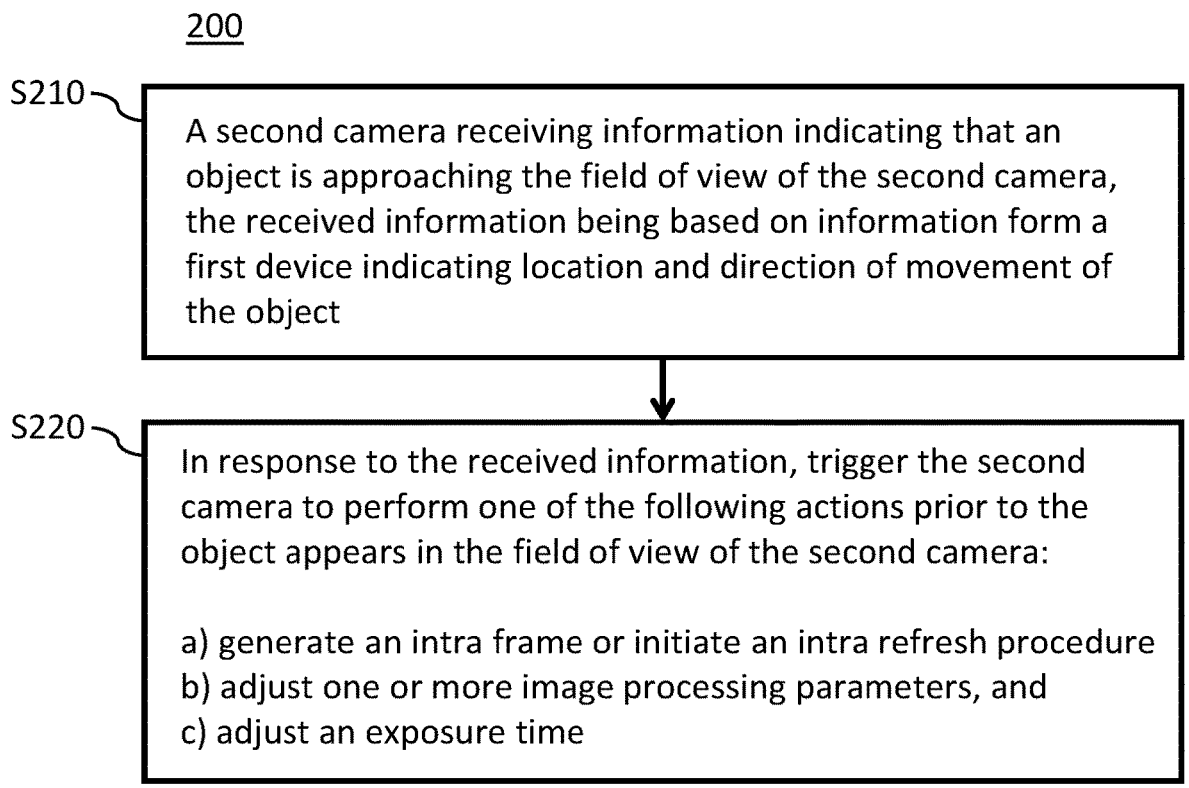
FIG. 2 shows a flow chart in relation to embodiments of a method for triggering a second camera to perform one or more actions prior to an object appearing in the field of view of the second camera.

FIG. 2 shows a flow chart in relation to embodiments of a method 200 for triggering a second camera to perform one or more actions prior to an object appearing in the field of view of the second camera is provided. The second camera is arranged in a camera system including the second camera and at least a first device. A location and a field of view is known for the second camera and a location is known for the first device. The method 200 comprises receiving S210, in the second camera, information indicating that the object is approaching the field of view of the second camera, wherein the received information is based on information from the first device indicating a location and a direction of movement of the object. The method 200 further comprises, in response to the received information, triggering S220 the second camera to perform one or more of the following actions prior to the object appearing in the field of view of the second camera: a) generating an intra frame or initiating an intra refresh procedure, b) adjusting one or more image processing parameters, and c) adjusting an exposure time.

The above-mentioned optional additional features of the second camera 100 described in relation to FIG. 1, when applicable, apply also to the method 200 described in relation to FIG. 2.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method for triggering a second camera to perform one or more actions prior to an object appearing in the field of view of the second camera, wherein the second camera is arranged in a camera system including the second camera and at least a first device, and wherein a location and a field of view is known for the second camera and a location is known for the first device, the method comprising:
   receiving, in the second camera, information indicating that the object is approaching the field of view of the second camera, wherein the field of view of the second camera has a plurality of subareas, and wherein the received information is based on information from the first device indicating a location and a direction of movement of the object, and
   in response to the received information, determining, in the second camera, at least one subarea of the plurality of subareas of the field of view of the second camera in which the object is estimated to first appear and triggering the second camera to perform at least one of the following actions prior to the object appearing in the field of view of the second camera:
      initiating an intra refresh procedure comprising intra encoding of a first portion of at least one image frame corresponding to one or more of the plurality of subareas, other than the at least one subarea, of the field of view of the second camera prior to intra encoding of a second portion of the least one image frame corresponding to the at least one subarea of the field of view of the second camera in which the object is estimated to first appear, or
      adjusting one or more image processing parameters only in the second portion of the at least one image frame that corresponds to the at least one subarea of the field of view of the second camera in which the object is estimated to first appear.

2. The method of claim 1, wherein the received information further indicates a time when the object is estimated to appear in the field of view of the second camera.

3. The method of claim 1, wherein the received information further indicates the at least one subarea of the field of view of the second camera in which the object is estimated to first appear.

4. The method of claim 1, further comprising generating, in the second camera, an I-frame before the object enters into the field of view of the second camera.

5. The method of claim 1, wherein adjusting one or more image processing parameters is performed locally in the second portion of the at least one image frame that corresponds to the at least one subarea of the field of view of the second camera in which the object is estimated to first appear.

6. The method of claim 1, wherein adjusting one or more image processing parameters comprises reducing low light noise filtering in the second portion of the at least one image frame that corresponds to the subarea of the field of view of the second camera in which the object is estimated to first appear.

7. The method of claim 1, wherein adjusting one or more image processing parameters comprises one or more of:
    setting the one or more image processing parameters to respective middle values as starting values for parameter optimization;
    reducing a threshold for background segmentation; or
    removing a division between background and foreground followed by identification of which portions of the at least one image frame belong to the background and which portions belong to the background when the object appears in the field of view of the second camera.

8. The method of claim 1, wherein the received information further indicates a velocity of the object.

9. The method of claim 8, wherein adjusting one or more image processing parameters comprises setting a temporal noise filter level based on the velocity of the object such that the higher the velocity, the higher the temporal noise filter level.

10. The method of claim 1, further comprising, in response to the received information, triggering the second camera to further perform the following action prior to the object appearing in the field of view of the second camera:
    adjusting an exposure time only in the second portion of the at least one image frame that corresponds to the at least one subarea of the field of view of the second camera in which the object is estimated to first appear.

11. The method of claim 10, wherein the received information further indicates the at least one subarea of the field of view of the second camera in which the object is estimated to first appear, and wherein adjusting an exposure time comprises setting a shorter exposure time in the second portion of the at least one image frame that corresponds to the subarea of the field of view of the second camera in which the object is estimated to first appear than the first portion of the at least one image frame that corresponds to the plurality of subareas, other than the at least one subarea, of the field of view of the second camera.

12. The method of claim 10, wherein the received information further indicates a velocity of the object, and wherein adjusting an exposure time is based on the velocity of the object such that the higher the velocity, the shorter the exposure time.

13. The method of claim 1, wherein the first device is one of:
    a first camera,
    a radar, or
    a lidar.

14. The method of claim 1, wherein the first device is a first camera, wherein the received information further comprises color balance correction or white balance correction of the first camera, wherein adjusting one or more image processing parameters comprises setting color balance correction or white balance correction according to the received information.

15. A non-transitory computer-readable storage medium having stored thereon instructions for implementing a method when executed in a camera having at least a receiver, a processor, and an encoder, the method for triggering a second camera to perform one or more actions prior to an object appearing in the field of view of the second camera, wherein the second camera is arranged in a camera system including the second camera and at least a first device, and wherein a location and a field of view is known for the second camera and a location is known for the first device, the method comprising:
    receiving, in the second camera, information indicating that the object is approaching the field of view of the second camera, wherein the field of view of the second camera has a plurality of subareas, and wherein the received information is based on information from the first device indicating a location and a direction of movement of the object, and
    in response to the received information, determining, in the second camera, at least one subarea of the plurality of subareas of the field of view of the second camera in which the object is estimated to first appear and triggering the second camera to perform at least one of the following actions prior to the object appearing in the field of view of the second camera:
        initiating an intra refresh procedure comprising intra encoding of a first portion of at least one image frame corresponding to the one or more of the plurality of subareas, other than the at least one subarea, of the field of view of the second camera prior to intra encoding of a second portion of the least one image frame corresponding to the at least one subarea of the field of view of the second camera in which the object is estimated to first appear, or
        adjusting one or more image processing parameters only in the second portion of the at least one image frame that corresponds to the at least one subarea of the field of view of the second camera in which the object is estimated to first appear.

16. A camera for performing at least one action prior to an object appearing in the field of view of the camera, the camera comprising:
    a receiver configured to, when the camera is arranged in a camera system including the camera and at least another device and a location and a field of view is known for the camera and a location is known for said another device, receive information indicating that the object is approaching the field of view of the camera, wherein the field of view of the camera has a plurality of subareas, and wherein the received information is based on information from said another device indicating a location and a direction of movement of the object;
    an encoder; and
    circuitry configured to execute:
        determining at least one subarea of the plurality of subareas of the field of view of the camera in which the object is estimated to first appear and
        a triggering function configured to, in response to the received information, trigger the camera to perform at least one of the following actions prior to the object appearing in the field of view of the camera:
            initiating an intra refresh procedure comprising intra encoding of a first portion of at least one image frame corresponding to one or more of the plurality of subareas, other than the at least one subarea, of the field of view of the camera prior to intra encoding of a second portion of the least one image frame corresponding to the at least one subarea of the field of view of the camera in which the object is estimated to first appear, or adjusting one or more image processing parameters only in the second portion of the at least one image frame that corresponds to the at least one subarea of the field of view of the second camera in which the object is estimated to first appear.

17. A method for triggering a second camera to perform one or more actions prior to an object appearing in the field of view of the second camera, wherein the second camera is arranged in a camera system including the second camera and at least a first device, and wherein a location and a field of view is known for the second camera and a location is known for the first device, the method comprising:

receiving, in the second camera, information indicating that the object is approaching the field of view of the second camera, wherein the field of view of the second camera has a plurality of subarea, and wherein the received information is based on information from the first device indicating a location and a direction of movement of the object, and wherein the received information further indicates a subarea of the field of view of the second camera in which the object is estimated to first appear, and in response to the received information, determining, in the second camera, at least one subarea of the plurality of subareas of the field of view of the second camera in which the object is estimated to first appear and triggering the second camera to perform the following action prior to the object appearing in the field of view of the second camera:

adjusting an exposure time comprising setting a shorter exposure time in a first portion of at least one image frame that corresponds to the subarea of the field of view of the second camera in which the object is estimated to first appear than a second portion of the at least one image frame that corresponds to the plurality of subareas, other than the at least one subarea, of the field of view of the second camera.

* * * * *